United States Patent Office

3,557,076
Patented Jan. 19, 1971

3,557,076
PROCESS FOR POLYMERIZING ISOPRENE IN CONTACT WITH A THREE-COMPONENT CATALYST PREPARED FROM TiCl$_4$, AlR$_2$Cl AND PARTICULAR SILANES
Augusto Bonfardeci and Lido Porri, Milan, Italy, assignors to Montecatini Edison S.p.A., Milan, Italy, a corporation of Italy
No Drawing. Filed Jan. 10, 1968, Ser. No. 696,720
Claims priority, application Italy, Jan. 11, 1967, 11,330A/67
Int. Cl. C08d 3/10
U.S. Cl. 260—94.3      4 Claims

ABSTRACT OF THE DISCLOSURE

In summary, isoprene is polymerized, in accordance with this invention, to a polyisoprene having elastic and mechanical properties practically identical with those of natural rubber, by subjecting the monomer to polymerizing conditions in contact with a catalyst prepared from the three components:

(1) titanium tetrachloride
(2) an organometallic compound AlR$_2$Cl in which R is an alkyl group containing 1 to 6 carbon atoms; and
(3) a silicium compound of the formula R$_a$Si(OR')$_b$ wherein R and R' are the same or different alkyl groups; $a$ is zero or a whole number from 1 to 3; and $b$ is a whole number from 1 to 4, $a+b$ being equal to 4.

---

This invention relates to a process for the polymerization of isoprene. More particularly, the invention provides a process for polymerizing isoprene to high molecular polymers having essentially cis-1,4 structure.

PRIOR ART

It is known that isoprene polymers showing cis-1,4 structure can be obtained by polymerizing the monomer, in a hydrocarbon solvent, in contact with a catalyst system AlR$_3$/TiCl$_4$ (in which R is an alkyl or aryl group). Although the structure of the resulting polymers is very similar to that of natural rubber, some characteristics of the synthetic polymers are different from those of natural rubber, mainly due to the synthetic polymers having a somewhat lower cis-1,4 content.

As is known, the higher the cis-1,4 content, and the lower the proportion of units in the polyisoprene having 3,4-configuration, the better the elastomeric properties of the polymer.

Elastomers obtained from the polyisoprene obtained with the aid of the above-mentioned catalyst systems AlR$_3$/TiCl$_4$ have less desirable elastic and mechanical properties than natural rubber.

It is known, furthermore, that catalyst systems TiCl$_4$/dialkyl aluminum halide do not polymerize isoprene to polymers having cis-1,4 structure.

However, our group has disclosed a process whereby isoprene is polymerized to polyisoprene having cis-1,4 structure by means of catalysts prepared from TiCl$_4$ and the product of reaction between H$_2$O and Al(C$_2$H$_5$)$_3$ in the molar ratio of 1:2, which process has the advantage that the cis-1,4 content of the polyisoprene obtained is practically the same as the cis-1,4 content of natural rubber. The practical value of this last-mentioned process is apparent, taking account of the importance of natural rubber in the elastomer art.

THE PRESENT INVENTION

As indicated in the summary, the present invention provides another process for polymerizing isoprene having essentially cis-1,4 structure and elastomeric and mechanical properties which are practically identical with those of natural rubber, using the catalyst systems TiCl$_4$/AlR$_2$Cl/R$_a$Si(OR')$_b$ as defined.

This present process not only yields polyisoprenes having a very high cis-1,4 content (generally at least 97%) but has the advantage of permitting use of a halogenated alkyl aluminum compound as catalyst-forming component, which is less dangerous to handle than aluminum trialkyls.

In general, the catalyst is prepared at a temperature above room temperature, e.g., at 50° C., in which case only about ten minutes are required for complete formation of the catalyst from the three components. The catalyst can also be prepared at room temperature or below, a longer time (20 minutes or more) being required for the catalyst to be completely formed.

The Al/Ti molar ratio can vary within very wide limits.

The relative amounts of TiCl$_4$ and AlR$_2$Cl used in preparing the catalyst are such that the Al/Ti molar ratio is, preferably, 2 or above, and most desirably near 5. The Si/Ti molar ratio is kept, preferably, between 1:1 and 1:2.

The polymerization can be performed over a wide temperature range. Preferably, the polymerization temperature is in the range from −30° C. to +60° C. The polymerization proceeds more quickly at the higher temperatures.

Given an adequate polymerization time, practically total conversion of isoprene to polyisoprene can be achieved by the present process.

The process is carried out in a polymerization solvent or diluent which may be an aliphatic hydrocarbon, such as n-heptane, a cycloaliphatic hydrocarbon, an aromatic hydrocarbon, or a mixture of such hydrocarbon solvents.

The nuclear magnetic resonance spectrum of the polyisoprene obtained by the present process is practically identical with the nuclear magnetic resonance spectrum of natural rubber. Examination of the spectrum of our polyisoprene, shows that the units thereof which have 3,4- and trans-1,4 configuration total not more than 3%, while 1,2- units are absent. The cis-1,4 content is, in general, at least 97%.

A comparison of the nuclear magnetic resonance spectrum of the present polyisoprene with that of isoprene polymers obtained using TiCl$_4$/AlR$_3$ catalyst systems reveals that the content of units different from cis-1,4 (trans-1,4 and 3,4 units) in the last-mentioned polymers is higher than the content of such different units which can be observed in our polyisoprene.

The results we obtain by polymerizing isoprene in accordance with the present process are surprising since, in the absence of the silicium compound, the other catalyst components and conditions being the same, a polymer having cis-1,4 structure is not obtained.

As shown in examples below, the cis-1,4-polyisoprene produced by the process of our invention can be vulcanized by the methods used conventionally for vulcanizing highly unsaturated elastomers, in particular using recipes based on sulfur and accelerators, to synthetic elastomers which have practically the same mechanical and dynamic properties as natural rubber vulcanized in the same way, using the same recipe. Dispersion of our vulcanized synthetic polyisoprene in aqueous medium results in latexes the properties of which are practically the same as natural rubber.

Silicium compounds useful as the third catalyst-forming component, in the practice of this invention, include $(CH_3)_3SiOC_2H_5$
$Si(OC_2H_5)_4$
$(C_2H_5)_3SiOC_2H_5$
$Si(Oi—C_4H_9)_4$
$(iC_4H_9)_3SiOC_2H_5$
$(iC_4H_9)_3SiOiC_4H_9$
$(CH_3)_3SiOCH_3$
$(C_5H_{11})_3SiOC_2H_5$ The following working examples are given to illustrate the invention and are not limiting.

EXAMPLE 1

Operating under a dry nitrogen atmosphere, the following compounds are introduced into a 100 cc. vessel provided with a mechanical agitator, dropping funnel and nitrogen inlet tube:

|  | Cc. |
|---|---|
| n-Heptane | 25 |
| $Al(C_2H_5)_2Cl$ | 0.35 |
| $TiCl_4$ | 0.06 |

The mass is agitated at 20° C. for about 15 minutes, after which a solution of 0.07 cc. of $(CH_3)_3SiOC_2H_5$ ($4.5 \times 10^{-4}$ mols) in 25 cc. of n-heptane is added dropwise over a period of about 10 minutes.

Agitation is continued for about 5 minutes after addition of the trimethylethoxysilane is completed. Isoprene (16 cc.) is then added and polymerized at 20° C. for about 2 hours and 40 minutes, after which the polymerization mixture is poured into methanol. There are obtained 3.2 gr. of polymer (conversion: 28%) having a content of cis-1,4 units of at least 97%. The gel content is very low (1%). The viscosity of this polyisoprene in toluene at 30° C. is 2.39 dl./g. The Mooney viscosity, ML (1+4) at 100° C. is 50.

The polyisoprene (100 parts by weight) is mixed with the following substances:

|  | Parts by wt. |
|---|---|
| "Antiox" (phenylbetanaphthyl amine) | 2 |
| Carbon black HAF | 50 |
| Stearic acid | 3 |
| ZnO | 3 |
| Vulcafor HBS (cyclohexyl benzothiazylsulfonamide) | 0.6 |
| Sulphur | 2.75 | and vulcanized to a medium hard rubber by heating the mix at 150° C. for 30 minutes. The vulcanizate has the following mechanical characteristics:

tensile strength: 200 kg./cm.$^2$
elongation at break: 320%
modulus at 300%: 185 kg./cm.$^2$
modulus at 200%: 105 kg./cm.$^2$ and the following dynamic properties:
"Heat build-up" measured on the Goodrich flexometer at 100° C.: 18° C.

EXAMPLE 2

The following compounds are introduced into a vessel of the type described in Example 1:

|  | Cc. |
|---|---|
| n-Heptane | 25 |
| $Al(C_2H_5)_2Cl$ | 0.40 |
| $TiCl_4$ | 0.06 |

The mass is agitated for about 15 minutes at 20° C., after which a solution of 0.08 cc. of $(CH_3)_3SiOC_2H_5$ ($6.1 \times 10^{-4}$ mols) in 25 cc. of n-heptane is added dropwise over a period of about 10 minutes.

Agitation is continued for about 5 minutes after completion of the trimethylethoxysilane addition. Thereafter, 15 cc. of isoprene are added. The isoprene is polymerized at 20° C. for one hour. The polymerization mixture is then poured into methanol, thus obtaining 3.8 g. of polymer (36% conversion) having a cis-1,4 units content not lower than 97%. The intrinsic viscosity of this polyisoprene in toluene at 30° C. is 3.50 dl./g.

EXAMPLE 3

About 25 cc. of n-heptane, 0.40 of diethyl aluminum monochloride, and 0.06 cc. of titanium tetrachloride are introduced into a 100 cc. vessel as described in Example 1, and agitated for about 15 minutes at 20° C. There is then added dropwise, over a period of about 15 minutes, a solution of 0.05 cc. trimethylethoxysilane in 25 cc. of n-heptane. Agitation is continued for about 5 minutes longer. Isoprene (14 cc.) is then added and polymerized at 20° C. for 12 hours, after which the polymerization mixture is poured into methanol. The polyisoprene precipitated amounts to 1.2 g. (12% conversion); has a content of cis-1,4 units not lower than 97%; and an intrinsic viscosity in toluene at 30° C. of 2.8 dl./g.

EXAMPLE 4

Into apparatus as described in Example 1 there are added: 25 cc. of benzene; 0.10 cc. of diethyl aluminum monochloride; and 0.06 cc. of titanium tetrachloride. The mass is agitated for about 15 minutes at 20° C., and a solution of 0.05 cc. of trimethylethoxysilane ($3.2 \times 10^{-4}$ mols) in 25 cc. of benzene are added dropwise over a period of about 10 minutes. The agitation is then continued for about 5 minutes longer. Thereafter, 10 cc. of isoprene are added and polymerized at 20° C. for one hour and fifty minutes. The polymerization mixture is poured into methanol to precipitate the polyisoprene, which amounts to 0.9 g. (13% conversion) and has the same cis-1,4 content as the product of the preceding examples.

EXAMPLE 5

Into a 100 cc. vessel as described in Example 1, there are added 25 cc. n-heptane, 0.40 cc. diethyl aluminum chloride, and 0.06 cc. of titanium tetrachloride. After agitation of the mass for about 15 minutes at 20° C., there is added dropwise, over a period of about 10 minutes, a solution of 0.04 cc. of tetraethoxysilane ($3.05 \times 10^{-4}$ mols) in 25 cc. of n-heptane.

After continuing the agitation for a further period of about 5 minutes, 15 cc. of isoprene are added and polymerized at 20° C. for 3 hours. Polyisoprene (1.7 g.; conversion: 16%) having properties similar to those of the product of Example 1 is precipitated from the polymerization mixture by pouring the latter into methanol.

EXAMPLE 6

The following compounds

|  | Cc. |
|---|---|
| n-Heptane | 25 |
| $Al(C_2H_5)_2Cl$ | 0.40 |
| $TiCl_4$ | 0.06 | are introduced into a vessel of the type described in Example 1, and agitated for about 15 minutes at 20° C. A solution of 0.08 cc. of $(CH_3)_3SiOC_2H_5$ in 25 cc. of n-heptane is added dropwise, over a period of about 10 minutes, and the agitation is continued for a further period of about 5 minutes, after which isoprene (15 cc.) is added and polymerized at 20° C. for 7 hours. The polymerization mixture is poured into methanol to precipitate the polyisoprene (5.7 g.; 54% conversion) having a content of cis-1,4 units not lower than 97%.

EXAMPLE 7

A 110 cc. vessel of the type described in Example 1 is used. The following materials

|  | Cc. |
|---|---|
| n-Heptane | 25 |
| $Al(C_2H_5)_2Cl$ | 0.40 |
| $TiCl_4$ | 0.06 | are introduced into the vessel and agitated at about 50° C. for about 15 minutes. A solution of 0.08 cc.

$$(CH_3)_3SiOC_2H_5$$

in 25 cc. n-heptane is added dropwise over a period of 10 minutes. The agitation is continued for about 5 minutes longer, after which isoprene (15 cc.) is added and polymerized at 50° C. After two hours, 50 cc. of n-heptane are added. After a four-hour polymerization time, the mixture is poured into methanol thus precipitating 9.4 g. of polyisoprene (conversion: 90%) having the same content of cis-1,4 units as the polyisoprene of the preceding examples. The gel content is less than 1%; the intrinsic viscosity in toluene at 30° C. is 3.10 dl./g.

EXAMPLE 8

Example 6 is repeated, using cyclohexane as the polymerization solvent, instead of n-heptane. The polyisoprene obtained is like the product of Example 6.

As will be apparent, changes and variations can be made in details, in practicing this invention, without departing from the spirit thereof. Therefore, we intend to include in the scope of the appended claims all such modifications as will be obvious to those skilled in the art from the description and working examples given.

We claim:
1. A process for preparing high molecular weight polyisoprene having essentially cis-1,4 structure, and the nuclear resonance spectrum of which is practically identical with that of natural rubber, which process comprises polymerizing isoprene in contact with a catalyst prepared from
   (1) titanium tetrachloride;
   (2) an organometallic compound $AlR_2Cl$, in which R is an alkyl group containing 1 to 6 carbon atoms; and
   (3) a compound selected from the group consisting of trimethylethoxy silane
   tetraethoxy silane
   triethylethoxy silane
   tetraisobutoxy silane
   triisobutylethoxy silane
   triisobutylisobutoxy silane and
   triamylethoxy silane, the amount of the silane in the catalyst being such that the percent thereof by weight, based on the weight of the isoprene, is between about 0.5% and about 0.65%, the Al/Ti molar ratio in the catalyst being from 2 to 5, and the silane/titanium molar ratio in the catalyst being from 1:1 to 1:2.

2. The process according to claim 1, characterized in that the Al/Ti molar ratio in the catalyst is 5.

3. The process according to claim 1, characterized in that the isoprene is polymerized at a temperature of from −30° C. to +60° C.

4. The process according to claim 1, characterized in that the isoprene is polymerized in an inert liquid diluent selected from the group consisting of aliphatic, cycloaliphatic and aromatic hydrocarbon solvents, and mixtures thereof.

References Cited

UNITED STATES PATENTS

| | | | |
|---|---|---|---|
| 2,977,349 | 3/1961 | Brockway | 260—94.3 |
| 3,046,267 | 7/1962 | Cohen et al. | 260—94.9 |
| 3,046,268 | 7/1962 | Cohen et al. | 260—94.9 |
| 3,046,269 | 7/1962 | Cohen et al. | 260—94.9 |
| 3,227,702 | 1/1966 | Small et al. | 260—94.9 |
| 3,408,340 | 10/1968 | Tanaka et al. | 260—88.2 |
| 3,440,179 | 4/1969 | Bayer et al. | 252—429 |

OTHER REFERENCES

Rochow "Chemistry of the Silicones," Wiley & Sons Inc., N.Y., 1951, pp. 56–57 relied on.

JOSEPH L. SCHOFER, Primary Examiner

R. A. GAITHER, Assistant Examiner